Feb. 14, 1928.
T. ELLIOTT
1,659,089
BOLSTER SPRING SUSPENSION MECHANISM
Filed July 22, 1926    2 Sheets-Sheet 2
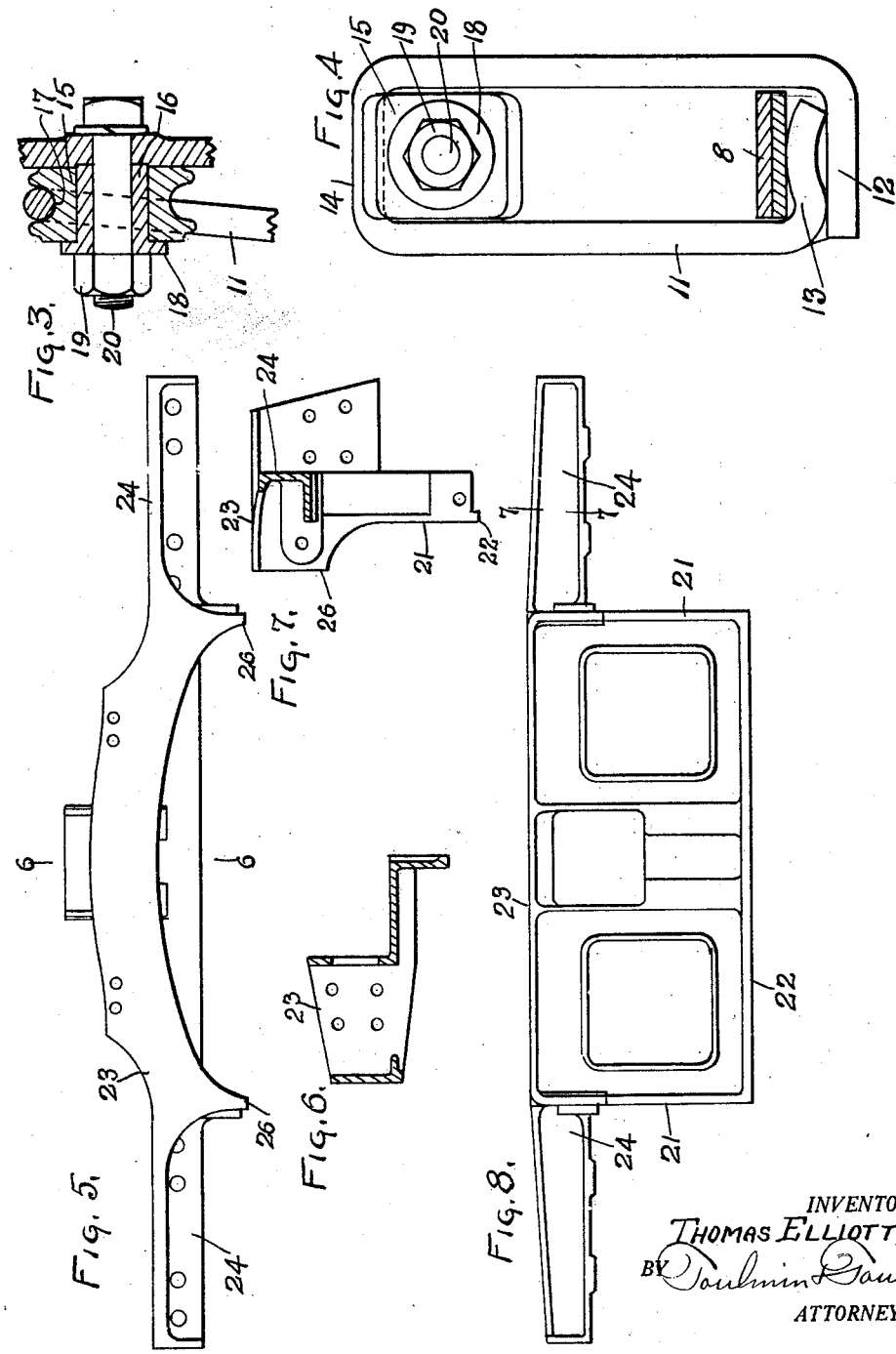
INVENTOR.
THOMAS ELLIOTT,
BY Toulmin & Toulmin,
ATTORNEYS.

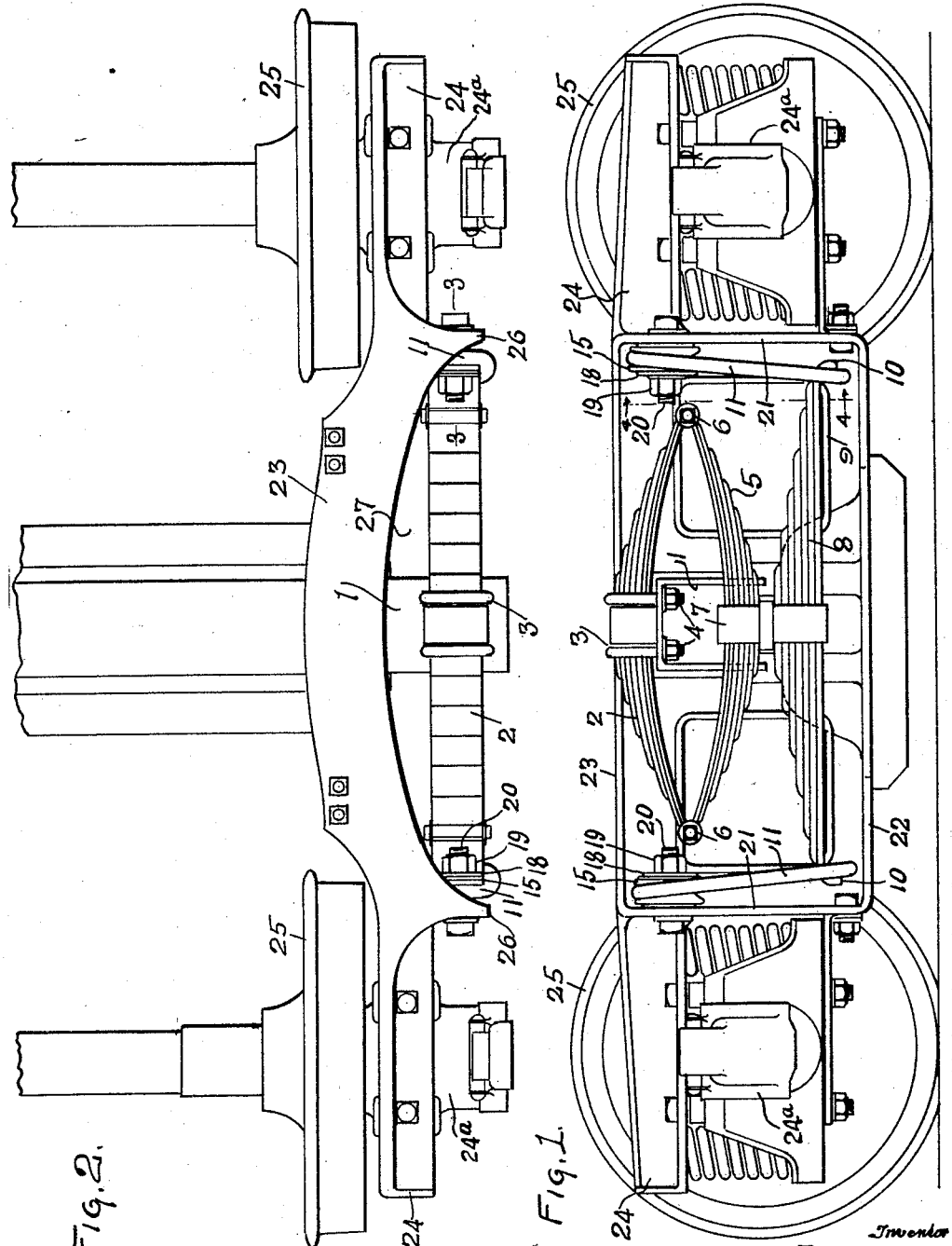

Patented Feb. 14, 1928.

1,659,089

UNITED STATES PATENT OFFICE.

THOMAS ELLIOTT, OF BIRMINGHAM, ALABAMA, ASSIGNOR TO THE CINCINNATI CAR COMPANY, OF CINCINNATI, OHIO, A CORPORATION OF OHIO.

BOLSTER-SPRING-SUSPENSION MECHANISM.

Application filed July 22, 1926. Serial No. 124,268.

My invention relates to bolster spring suspension mechanism.

It is the object of my invention to provide a fully floating spring suspension from the bolster to the car truck frame.

It is my further object to provide such a connection and such a spring mechanism that the spring mechanism will function in all positions of the bolster relative to the truck frame no matter what displacements take place forwardly or laterally of the vehicle.

It is my object to provide such an arrangement in order to not only compensate for the strains of starting, stopping and braking without communicating them to the body of the vehicle, but also to provide a construction which is strong and simple and is subject to the minimum of wear. The parts that are subjected to wear are easily replaceable and are simple in construction and cheap to manufacture.

Referring to the drawings:

Figure 1 is a side elevation of the spring suspension and truck frame;

Figure 2 is a plan view of the bolster truck frame and the spring suspension;

Figure 3 is a section on the line 3—3 of Figure 2 showing the collar suspension mechanism in section used to suspend one of the floating links;

Figure 4 is a section on the line 4—4 of Figure 1;

Figure 5 is a detail plan view of the side frame;

Figure 6 is a section on the line 6—6 of Figure 5;

Figure 7 is a section on the line 7—7 of Figure 8;

Figure 8 is a detail view of the side frame in side elevation.

Referring to the drawings in detail, 1 is a bolster upon the either end of which is mounted the upper half 2 of a full elliptic spring. This mounting of the spring is secured through the agency of inverted U-bolts 3 which pass through the bolster and are held in position by the nuts 4. The lower half of this full elliptic spring is designated 5 and is connected to the upper half at either end by the eye bolts 6.

The medium portion of the lower half of this full elliptic spring 5 is connected by a clamp 7 to a semi-elliptic flat plate spring 8 which is also clamped by the clamps 7.

The lower leaf 9 of this semi-elliptic spring which is the lowest and longest leaf has its ends 10 turned over to form downwardly projecting ends or hooks. These ends are arranged to secure in position the depending floating links 11 which consist of rods having lower overlapping ends 12 and 13 and a cross top portion 14. The ends 12, 13 and 14 are substantially parallel to one another and substantially at right angles to the depending side members with the exception that the end member 13 is somewhat arcuate in form, forming a base upon which the spring leaves of the semi-elliptic spring 8 are mounted.

The upper ends of the floating links are respectively mounted upon a rectangular or square supporting collar 15 mounted on the sleeve 16. The sleeve 16 is cylindrical and forms a bearing cylinder on which the rocking block 15 may rock with the link 11. The rock block is provided with a groove 17 which provides for the round rod-like link 11 rocking therein fore and aft of the vehicle.

The collar is provided with an outside flange 18 which is connected by the nut 19 on the supporting bolt 20 which passes through the depending, supporting truck frame member 21. The two depending truck frame members 21 are joined at the bottom by a fore and aft frame member 22 and at the top by a smaller frame member 23. The four parts 21, 22 and 23 form a rectangular frame having extensions 24 supported by brackets 24ª which are mounted in the usual manner upon the wheels 25.

It will be observed that this upper central portion of the frame member 23 is arcuate in form when viewed in plan with its extreme ends designated 26 constituting the supporting portions from which the end members 21 depend, which, in turn, support the bolts 20 and the links 11.

The upper portion of the elliptic spring, particularly the upper half 2, is adapted to project upwardly through the space 27 formed by the arcuate frame 23, thus providing ample clearance to one side of the truck frame for the vertical movement of the springs.

It will be understood that I desire to comprehend within my invention such modifications as may be necessary to adapt it to varying conditions and uses.

Having thus fully described my invention, what I claim as new and desire to secure by Letters Patent, is:—

1. In combination, a bolster, an arcuate spring means mounted thereon, a truck frame having an arcuate portion opposite the spring to permit the spring to pass such portion of the frame, and means connecting the said spring means to the said truck frame.

2. In combination, a bolster, an arcuate spring means mounted thereon, a truck frame, the said truck frame having an arcuate portion opposite the spring to permit the spring to pass such portion of the frame, and means connecting said spring means to said truck frame, said connecting means being adapted to permit lateral and forward movement of said bolster and spring means relative to said frame as well as the vertical movement due to the compression and expansion of the spring means.

3. In combination, a bolster, spring means mounted thereon, a truck frame having an arcuate portion opposite the spring to permit the spring to pass such portion of the frame, and means to suspend said spring means from the ends of the arcuate portion of the frame, and wheels to support said frame.

4. In combination, a bolster, spring means mounted thereon, a truck frame, having an arcuate portion opposite the spring to permit the spring to pass such portion of the frame, and means to suspend said spring means from the ends of the arcuate portion of the frame, and wheels to support said frame, said suspending means between said spring and said frame being adapted to permit forward and lateral relative movement of said spring means and bolster relative to said frame.

5. In combination, a transverse bolster, a truck frame having an arcuate portion, brackets extending from the ends of said frame and attached to axles and wheels, spring means mounted on the ends of said bolster in the space between the ends of said arcuate portion of the truck frame, supporting blocks mounted on the ends of said arcuate portion, links depending therefrom having their free ends connected to said spring means.

6. In combination, a transverse bolster, a truck frame having an arcuate portion, brackets extending from the ends of said frame and attached to axles and wheels, spring means mounted on the ends of said bolster in the space between the ends of said arcuate portion of the truck frame, supporting blocks mounted on the ends of said arcuate portion, links depending therefrom having their free ends connected to said spring means, said links being arranged to turn laterally with said blocks and to rotate freely fore and aft in said blocks, and means to support said blocks on the ends of the arcuate portion of the frame to permit said rotation relative thereto.

7. In combination, a transverse bolster a truck frame having an arcuate portion, brackets extending from the ends of said frame and attached to axles and wheels, springs means mounted on the ends of said bolster in the space between the ends of said arcuate portion of the truck frame, supporting blocks mounted on the ends of said arcuate portion, links depending therefrom having their free ends connected to said spring means, said links being arranged to turn laterally with said blocks and to rotate freely fore and aft in said blocks, and means to support said blocks on the ends of the arcuate portion of the frame to permit said rotation relative thereto, and bearing sleeves on said supporting means between said supporting means and said blocks.

8. In combination, a transverse bolster, a frame having an arcuate portion and outwardly projecting ends, brackets projecting from said ends, axles and wheels connected thereto, said wheels being located within said brackets, a full elliptic spring mounted on the end of said bolster on the outside of said arcuate portion of the frame between the ends thereof, a semi-elliptic spring connected to the bottom half of the full elliptic spring, links connected to the free ends of the semi-elliptic spring and supported on the free ends of the arcuate portion of the truck frame.

9. In combination, a transverse bolster, a frame having an arcuate portion and outwardly projecting ends, brackets projecting from said ends, axles and wheels connected thereto, said wheels being located within said brackets, a full elliptic spring mounted on the end of said bolster on the outside of said arcuate frame between the ends thereof, a semi-elliptic spring connected to the bottom half of the full elliptic spring, links connected to the free ends of the semi-elliptic spring and supported on the free ends of the arcuate portion of the truck frame, blocks pivotally mounted on the ends of the truck frame for supporting said links adapted to permit forward movement of said links thereon fore and aft thereof and to turn with said links when the links move laterally.

10. In combination, a transverse bolster, a frame having an arcuate portion and outwardly projecting ends, brackets projecting from said ends, axles and wheels connected thereto, said wheels being located within said brackets, a full elliptic spring mounted on the end of said bolster on the outside of said arcuate frame between the ends thereof, a semi-elliptic spring connected to the bottom half of the full elliptic spring, links connected to the free ends of the semi-elliptic spring and supported on the free ends of the arcuate portion of the truck frame, blocks pivotally mounted on the ends of the truck frame for supporting said links adapted to permit forward movement of said links thereon fore and aft thereof and to turn with said links when the links move laterally, and means on the bottom of said links to engage yieldingly with the free ends of said semi-elliptic spring.

11. In combination, a transverse bolster, a unit on either end thereof consisting of a truck frame in arcuate form having outwardly extending ends located over said bolster, a full elliptic spring having its upper half mounted on said bolster and the lower half therebeneath, said spring being located between the ends of the arcuate frame, a semi-elliptic relatively flat spring connected to the lower half of the full elliptic spring, links connected to said flat semi-elliptic spring at the bottom thereof, said links being connected at their top to blocks pivotally mounted on the free end of said truck frame, said blocks adapted to turn with said links, bolts to support said blocks, bearing sleeves on said bolts between said blocks and said bolts, brackets extending parallel to said springs from either ends of said arcuate frame, wheels and axles connected to said brackets.

12. In combination, a transverse bolster, an arcuate truck frame having its upper portion above said bolster and a lower portion therebeneath, depending end members from the outer ends of the arcuate frame connecting the upper and lower portions thereof, blocks suspended from the upper parts of said depending portions pivotally mounted thereon, depending links mounted on said blocks adapted to move fore and aft thereon and to turn laterally therewith, a flat leaved spring having depending extreme ends connected to the free ends of said links, a full elliptic spring mounted on said flat spring, said bolster being connected to the upper half of said full elliptic spring between the halves thereof, and brackets extending from the free ends of said arcuate truck frame, axles and wheels connected to said brackets.

13. In combination, in a spring support, of a spring, a rectangular link having one end adapted to support said spring on its transverse portion, the upper end resting on a rectangular block in a groove therein so arranged that the link can move fore and aft of said block but will turn laterally of said block, a supporting bolt for said block and a bearing sleeve interposed between said block and said bolt.

In testimony whereof, I affix my signature.

THOMAS ELLIOTT.